United States Patent
Chen et al.

(10) Patent No.: US 10,645,543 B2
(45) Date of Patent: May 5, 2020

(54) ELEVATOR SERVICE REQUESTING BASED ON SOCIAL MEDIA APPLICATION MODULE

(71) Applicant: Otis Elevator Company, Farmington, CT (US)

(72) Inventors: Hui Chen, Shanghai (CN); Shenhong Wang, Shanghai (CN); Siqi Ma, Shanghai (CN); Fu Qi, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/409,125

(22) Filed: May 10, 2019

(65) Prior Publication Data
US 2019/0349724 A1    Nov. 14, 2019

(30) Foreign Application Priority Data

May 11, 2018 (CN) .......................... 2018 1 0447898

(51) Int. Cl.
*H04W 4/21* (2018.01)
*H04W 76/10* (2018.01)
*B66B 1/34* (2006.01)
*B66B 1/46* (2006.01)

(52) U.S. Cl.
CPC ............. *H04W 4/21* (2018.02); *B66B 1/3461* (2013.01); *B66B 1/468* (2013.01); *H04W 76/10* (2018.02); *B66B 2201/4653* (2013.01)

(58) Field of Classification Search
CPC ............ B66B 1/468; B66B 2201/4615; B66B 1/3461; B66B 5/0012; B66B 19/007; B66B 2201/4653; H04W 4/21; H04W 76/10
See application file for complete search history.

(56) References Cited

U.S. PATENT DOCUMENTS

| | | | |
|---|---|---|---|
| 9,464,906 B1 * | 10/2016 | Baughman | ......... G01C 21/3469 |
| 9,734,693 B2 | 8/2017 | McKinley et al. | |
| 9,896,305 B2 | 2/2018 | Blandin et al. | |
| 10,127,492 B1 * | 11/2018 | Chitiveli | ................ G06N 3/006 |
| 10,169,699 B1 * | 1/2019 | Chitiveli | ................ G06N 3/006 |
| 2012/0037461 A1 * | 2/2012 | Finschi | ................... B66B 1/468 |
| | | | 187/382 |
| 2016/0016755 A1 | 1/2016 | Hanninen et al. | |
| 2016/0221791 A1 * | 8/2016 | Berryhill | ................ B66B 1/468 |

(Continued)

FOREIGN PATENT DOCUMENTS

| | | |
|---|---|---|
| CN | 103552892 A | 2/2014 |
| CN | 104590963 A | 5/2015 |

(Continued)

*Primary Examiner* — Matthew C Sams
(74) *Attorney, Agent, or Firm* — Cantor Colburn LLP (57) ABSTRACT

A speed governor assembly and an elevator system. The speed governor assembly includes: a sheave; a centrifugal mechanism mounted on the sheave and rotating together with the sheave; an overspeed protection switch at a first distance from a radial outer side of the centrifugal mechanism; a core ring disposed coaxially with the sheave; and a triggering arm rotating together with the core ring; wherein the centrifugal mechanism engages with the core ring and drives the core ring and the triggering arm to rotate when the sheave reaches a second speed, and the rotation of the triggering arm can contact and trigger the overspeed protection switch.

22 Claims, 3 Drawing Sheets

(56) References Cited

U.S. PATENT DOCUMENTS

| | | | | |
|---|---|---|---|---|
| 2016/0325962 A1* | 11/2016 | Blandin | .................. | B66B 1/468 |
| 2016/0376124 A1* | 12/2016 | Bunter | .................... | B66B 1/468 |
| | | | | 187/247 |
| 2017/0260024 A1* | 9/2017 | Sha | ........................... | B66B 3/00 |
| 2018/0099840 A1* | 4/2018 | Armistead | ........... | G05B 19/042 |
| 2018/0346283 A1* | 12/2018 | Scoville | ............... | B66B 1/3461 |
| 2018/0370758 A1* | 12/2018 | Huang | .................. | B66B 1/2408 |
| 2018/0370760 A1* | 12/2018 | Huang | .................. | B66B 1/468 |
| 2018/0370761 A1* | 12/2018 | Huang | .................. | B66B 1/3461 |
| 2019/0152741 A1* | 5/2019 | Wedzikowski | ......... | H04W 4/33 |
| 2019/0263627 A1* | 8/2019 | Huang | .................... | B66B 1/468 |

FOREIGN PATENT DOCUMENTS

| | | | |
|---|---|---|---|
| CN | 106044418 A | | 10/2016 |
| CN | 106516927 A | | 3/2017 |
| CN | 108002155 A | * | 5/2018 |
| WO | 2011102654 A2 | | 8/2011 |
| WO | 2014178790 A1 | | 11/2014 |
| WO | 2015119620 A1 | | 8/2015 |
| WO | 2016207477 A1 | | 12/2016 |
| WO | 2017175019 A1 | | 10/2017 |
| WO | 2017175021 A1 | | 10/2017 |

* cited by examiner

ELEVATOR SERVICE REQUESTING BASED ON SOCIAL MEDIA APPLICATION MODULE

FOREIGN PRIORITY

This application claims priority to Chinese Patent Application No. 201810447898.5, filed May 11, 2018, and all the benefits accruing therefrom under 35 U.S.C. § 119, the contents of which in its entirety are herein incorporated by reference.

TECHNICAL FIELD

The present invention relates to the technical field of elevators, and more particularly to an elevator service request system and method based on a social media application component.

BACKGROUND ART

In an existing elevator system, one of commonly used elevator service request operation methods is as follows: a passenger manually presses an elevator call button on an elevator call request input device installed in an elevator landing zone to input an up or down elevator call request command, and then enters an elevator car and registers a destination floor through manual operation. Such an elevator service request operation method requires manual operations. As a result, the elevator service request operation becomes difficult, especially for passengers who cannot perform the button pressing operation freely with hands (for example, when the passenger is carrying things in both hands), affecting the passenger experience.

With the development of automatic elevator service request operation technologies, various technologies for automatically implementing an elevator service request operation by using a smart mobile terminal such as a mobile phone have been developed. However, the passenger experience still needs to be improved.

In addition, with the popularity of smart mobile terminals, most passengers who are going to take an elevator use social media application components installed in the smart mobile terminals, and the social media application components are playing an increasingly important role in the daily life of elevator passengers.

SUMMARY OF THE INVENTION

According to a first aspect of the present invention, an elevator service request system is provided, including a wireless signal apparatus configured to broadcast a wireless signal and establish wireless communication with a personal mobile terminal carried by a passenger based on the wireless signal, wherein the wireless signal apparatus is configured to be adapted to communicate with a social media application component in the personal mobile terminal; wherein the elevator service request system sends, through an elevator service request component installed in the social media application component, an elevator service request command to the wireless signal apparatus that is already in communication with the social media application component; and wherein the wireless signal apparatus is further configured to receive the elevator service request command.

In the elevator service request system according to an embodiment of the present invention, the wireless signal apparatus is further configured to send the received elevator service request command to a corresponding elevator controller.

In the elevator service request system according to an embodiment of the present invention, the wireless signal apparatus is further configured to push a message to the social media application component in the personal mobile terminal.

In the elevator service request system according to an embodiment of the present invention, the pushed message includes at least one of the following message types: elevator running status information; response result information of an elevator system for the elevator service request command; and service information associated with a current location of the wireless signal apparatus.

In the elevator service request system according to an embodiment of the present invention, the wireless signal apparatus is installed in an elevator car and/or a landing zone of an elevator system.

In the elevator service request system according to an embodiment of the present invention, the wireless signal apparatus is configured with an interface protocol module configured to implement the communication, the interface protocol module being implemented based on a device access interface protocol provided by a developer of the social media application component.

In the elevator service request system according to an embodiment of the present invention, the wireless signal apparatus is configured with an identifier, and the identifier is broadcast together with the wireless signal.

In the elevator service request system according to an embodiment of the present invention, the wireless signal apparatus is added to a hardware list of the social media application component through the personal mobile terminal by receiving an identifier broadcast by the wireless signal apparatus or scanning and recognizing the identifier of the wireless signal apparatus, the hardware list being a list of hardware capable of communicating with the social media application component.

In the elevator service request system according to an embodiment of the present invention, a communication connection is automatically established with the wireless signal apparatus through the elevator service request component of the personal mobile terminal to send the elevator service request command.

In the elevator service request system according to an embodiment of the present invention, the social media application component is WeChat, WhatsApp, Line, Weibo, Twitter, or Facebook.

In the elevator service request system according to an embodiment of the present invention, the wireless signal apparatus is a Bluetooth module or a Bluetooth Low Energy module, and the wireless signal is a Bluetooth signal or a Bluetooth Low Energy signal.

According to a second aspect of the present invention, an elevator service request method is provided, including: broadcasting a wireless signal; establishing communication with a social media application component in a personal mobile terminal; and receiving an elevator service request command from an elevator service request component installed in the social media application component.

According to an embodiment of the present invention, the elevator service request method further includes a step of sending the received elevator service request command to a corresponding elevator controller.

According to an embodiment of the present invention, the elevator service request method further includes a step of pushing a message to the social media application component in the personal mobile terminal.

In the elevator service request method according to an embodiment of the present invention, the pushed message includes at least one of the following message types:

elevator running status information;

response result information of an elevator system for the elevator service request command; and service information associated with a current location of a wireless signal apparatus.

In the elevator service request method according to an embodiment of the present invention, in the step of pushing a message, the service information is pushed to the social media application component through a first server coupled to a plurality of wireless signal apparatuses configured to broadcast wireless signals and a second server provided corresponding to the social media application component.

In the elevator service request method according to an embodiment of the present invention, in the step of pushing a message, the elevator running status information and the response result information are directly pushed to the social media application component through the wireless signal apparatus configured to broadcast the wireless signal.

In the elevator service request method according to an embodiment of the present invention, the elevator service request command includes an elevator service request command regarding a destination floor and/or an elevator service request command regarding an elevator call direction.

In the elevator service request method according to an embodiment of the present invention, in the step of establishing communication, the communication is established based on a device access interface protocol provided by a developer of the social media application component.

In the elevator service request method according to an embodiment of the present invention, in the step of broadcasting a wireless signal, an identifier of a wireless signal apparatus is further broadcast.

In the elevator service request method according to an embodiment of the present invention, the social media application component is WeChat, WhatsApp, Line, Weibo, Twitter, or Facebook.

In the elevator service request method according to an embodiment of the present invention, the wireless signal is a Bluetooth signal or a Bluetooth Low Energy signal, and the communication is Bluetooth communication or Bluetooth Low Energy communication.

According to a third aspect of the present invention, a wireless signal apparatus is provided, including a memory, a processor, and a program that is stored in the memory and can be run on the processor, wherein when the program is executed by the processor, the steps of any one of the above-mentioned elevator service request methods are implemented.

According to a fourth aspect of the present invention, a computer readable storage medium is provided, having stored thereon a computer program, wherein the program is executable by a processor to perform the steps of any one of the above-mentioned elevator service request methods.

According to a fifth aspect of the present invention, an elevator system is provided, including: any one of the above-mentioned elevator service request systems; an elevator controller, configured to control operation of one or more elevator cars in the elevator system; wherein the elevator controller is coupled to the wireless signal apparatus in the elevator service request system and at least controls the operation of the one or more elevator cars in the elevator system in response to the elevator service request command.

The foregoing features and operations of the present invention will become more apparent from the following descriptions and accompanying drawings.

BRIEF DESCRIPTION OF DRAWINGS

The following detailed description with reference to the accompanying drawings will make the foregoing and other objectives and advantages of the present invention more complete and clearer, wherein the same or similar elements are denoted by the same reference numerals.

DETAILED DESCRIPTION

The following is a description of exemplary embodiments of the present invention, examples of which are illustrated in the accompanying drawings. Whenever possible, the same reference numerals will be used in all drawings to refer to the same or similar parts.

For the purposes of brevity and illustration, the principles of the present invention are described herein primarily with reference to exemplary embodiments thereof. However, those skilled in the art will readily recognize that the same principles are equivalently applicable to all types of wireless signal apparatuses, elevator service request systems using the wireless signal apparatuses, and/or corresponding methods implemented by them. These same principles can be implemented therein, and any such variations do not depart from the true spirit and scope of the present patent application. Further, in the following description, reference is made to the accompanying drawings. The accompanying drawings show particular embodiments. Electrical, mechanical, logical, and structural changes may be made to these embodiments without departing from the spirit and scope of the present invention. Furthermore, although the features of the present invention are disclosed in connection with only one of several implementations/embodiments, such features may be combined with one or more other features of other implementations/embodiments as long as the combination is desirable or beneficial for any given or identifiable function. Therefore, the following description should not be considered as limiting the present invention, and the scope of the present invention is defined by the appended claims and their equivalents.

Figure 1:
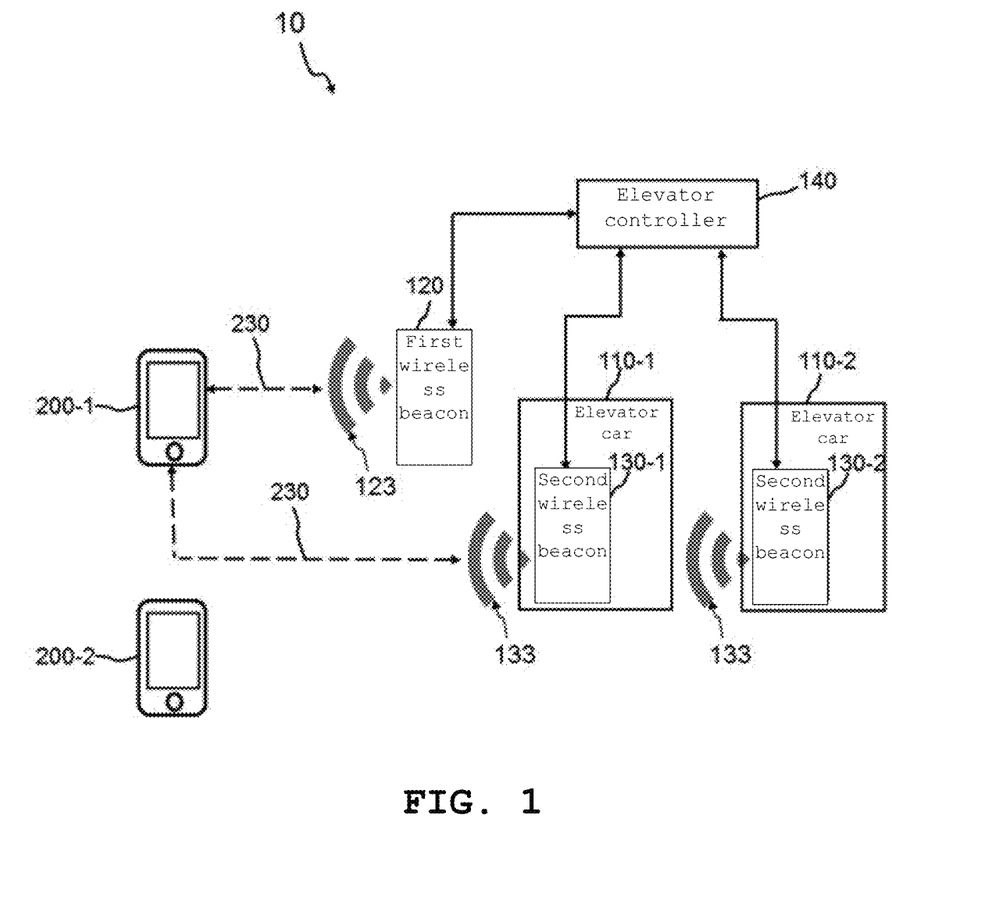
FIG. 1 is a schematic diagram of an elevator system according to an embodiment of the present invention, in which an elevator service request system according to an embodiment of the present invention is used.
Figure 2:
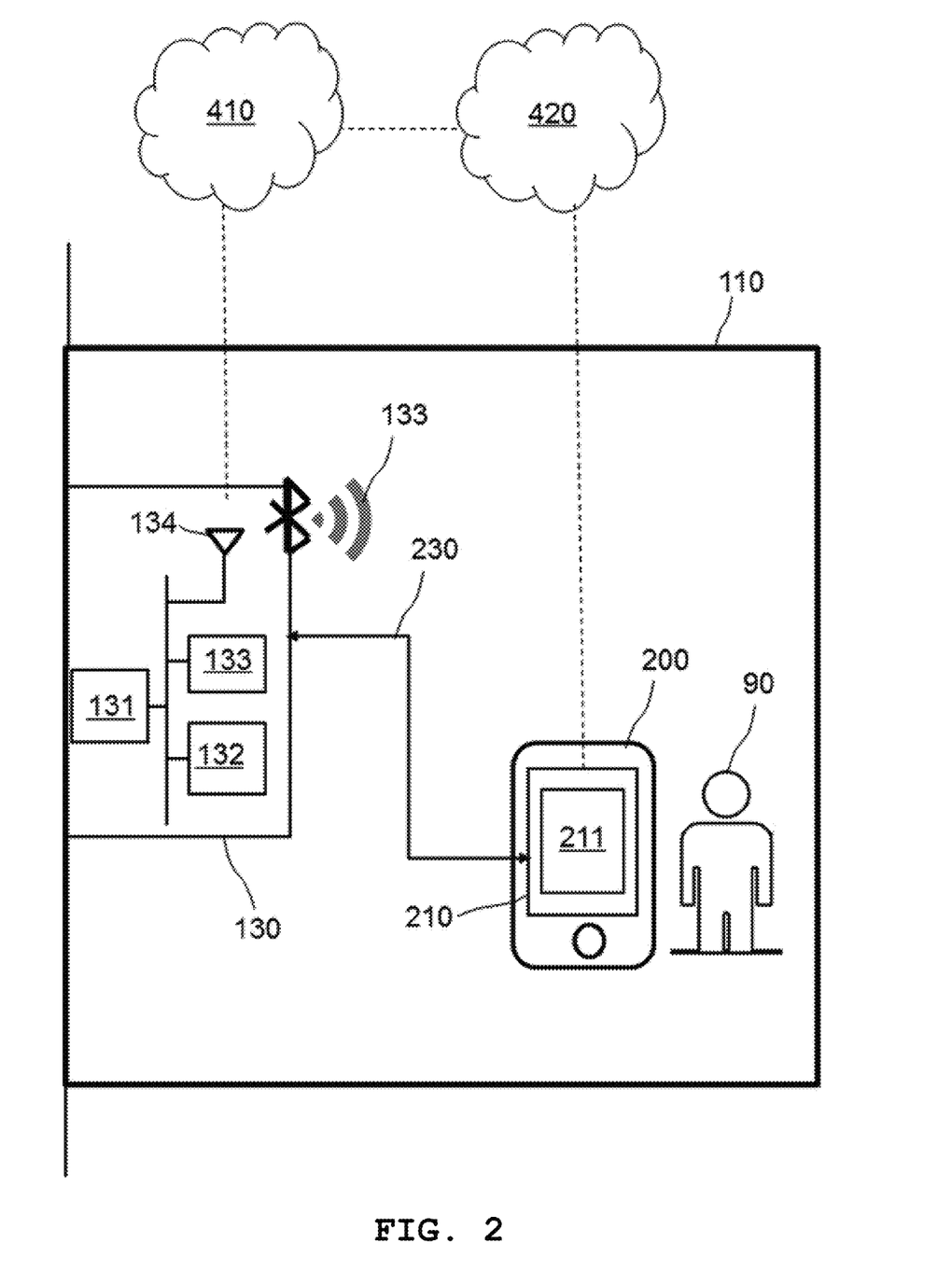
FIG. 2 is a schematic diagram of an elevator service request system according to an embodiment of the present invention.

FIG. 1 is a schematic diagram of an elevator system according to an embodiment of the present invention, in which an elevator service request system according to an embodiment of the present invention is used. FIG. 2 is a schematic diagram of an elevator service request system according to an embodiment of the present invention. A wireless signal apparatus 120 or 130, an elevator service request system, and an elevator system 10 according to embodiments of the present invention are described in detail below by way of example with reference to FIG. 1 and FIG. 2.

The elevator system 10 according to the embodiment of the present invention can be installed in various buildings. The elevator system 10 includes one or more (for example, two or more) elevator cars 110 that can move vertically in a hoistway of a building. FIG. 1 shows two elevator cars: elevator cars 110-1 and 110-2. Each elevator car 110 is assigned a corresponding identifier (for example, UUID), and is under the control (such as scheduling control and movement control) of an elevator controller 140 in the elevator system 10, so as to move in the hoistway or stop at the corresponding landing. The elevator controller 140 needs to acquire elevator service request commands from elevator landing zones of various floors or from the elevator cars 110, thus controlling running of the elevator based on the commands, for example, performing scheduling control on the elevator cars 110. It will be appreciated that the specific control manner or control principle based on which the elevator controller 140 controls the one or more elevator cars 110 is not limited, and the specific structure, arrangement manner or the like of the elevator controller 140 is not limited either.

The elevator service request command may specifically be an elevator service request command regarding an elevator call direction (that is, an elevator call request command) and/or an elevator service request command regarding a destination floor (that is, a destination floor registration command).

To enable a passenger 90 to automatically send the elevator call request command from or near the elevator landing zone, in the elevator service request system according to the embodiment of the present invention, a first wireless signal apparatus 120 according to an embodiment of the present invention is provided. The first wireless signal apparatus 120 can be installed in each elevator landing zone of the elevator system 10. For example, at least one first wireless signal apparatus 120 is installed in each elevator landing zone, so that first wireless signals 123 sent out or broadcast by the first wireless signal apparatuses 120 can effectively cover each elevator landing zone approximately, thus forming a corresponding coverage area. It should be noted that, the signal intensity of the first wireless signal 123 broadcast by the first wireless signal apparatus 120 attenuates with its broadcasting distance. The specific attenuation manner is not limited herein.

Still as shown in FIG. 1, to enable the passenger 90 to automatically send the destination floor registration command from the elevator car 110, the elevator service request system of the elevator system 10 further includes one or more second wireless signal apparatuses 130 (for example, second wireless signal apparatuses 130-1 and 130-2) according to an embodiment of the present invention. Each second wireless signal apparatus 130 is installed in the corresponding elevator car 110. For example, one second wireless signal apparatus 130-1 is provided in the elevator car 110-1 and another second wireless signal apparatus 130-2 is provided in the elevator car 110-2. In an embodiment, the second wireless signal apparatus 130 may be installed on a destination floor registration control panel in the elevator car 110, for example, integrated on the destination floor registration control panel. The installation manner of the second wireless signal apparatus 130 with respect to the elevator car 110 is not limited to the above example.

The second wireless signal apparatus 130 can transmit or broadcast a second wireless signal 133, for example, broadcast the second wireless signal 133 continuously (for example, at short time intervals). The signal intensity of the second wireless signal 133 attenuates with its broadcasting distance. The specific attenuation manner is not limited herein. The second wireless signal 133 broadcast by the second wireless signal apparatus 130 can effectively cover its installation area in the elevator car 110 approximately, thus forming a corresponding coverage area.

It should be noted that, the first wireless signal apparatus 120 and/or the second wireless signal apparatus 130 is coupled to the elevator controller 140, so that during running of each elevator car 110, the first wireless signal apparatus 120 and/or the second wireless signal apparatus 130 can acquire the desired information in real time from the elevator controller 140, for example, elevator running status information, such as current floor information, traveling direction information, load, and time at which the elevator car 110 is estimated to arrive at the corresponding landing.

In an embodiment, the first wireless signal apparatus 120 and/or the second wireless signal apparatus 130 can be a Bluetooth module, and can specifically be a Bluetooth Low Energy (BLE) module. Correspondingly, the first wireless signal 123 transmitted or broadcast by the first wireless signal apparatus 120 and/or the second wireless signal 133 transmitted or broadcast by the second wireless signal apparatus 130 may be a Bluetooth signal (such as a BLE signal). Thereby, the power consumption and costs of the elevator service request system can be greatly reduced. It will be appreciated that, the first wireless signal apparatus 120 and/or the second wireless signal apparatus 130 may also be wireless signal apparatuses of other types, for example, a Wifi apparatus.

Once a personal mobile terminal 200 carried by the passenger 90 senses a wireless signal broadcast by the first wireless signal apparatus 120 and/or the second wireless signal apparatus 130, the personal mobile terminal 200 interacts with the first wireless signal apparatus 120 and/or the second wireless signal apparatus 130. For example, the first wireless signal apparatus 120 and/or the second wireless signal apparatus 130 may establish wireless communication with the personal mobile terminal 200 carried by the passenger 90 to receive an elevator service request command from the personal mobile terminal 200, thus automatically completing the corresponding elevator service request operation. Exemplarily, as shown in FIG. 1, the first wireless signal apparatus 120 and the second wireless signal apparatus 130 may respectively establish wireless communication with personal mobile terminals 200-1 and 200-2 respectively carried by two passengers 90.

The elevator service request system according to the embodiments of the present invention is described below with reference to FIG. 2 and by using interaction between the second wireless signal apparatus 130 installed in the elevator car 110 and the personal mobile terminal 200 as an example. It will be appreciated that, the principle of establishing wireless communication between the first wireless signal apparatus 120 and the personal mobile terminal 200 is substantially the same. The first wireless signal apparatus 120 may have substantially the same construction and function as the second wireless signal apparatus 130.

In an embodiment, as shown in FIG. 2, the personal mobile terminal 200 carried by the passenger 90 includes a social media application component 210 installed therein. The social media application component 210 may be, but not limited to, WeChat, WhatsApp, Line, Weibo, Twitter, Facebook, or the like. The social media application component 210 specifically may be a social media application component 210 most commonly used by passengers 90 in the corresponding country or region, for example, WeChat which is widely used in China. In the social media application component 210, for example, an elevator service request component 211 is further installed in the form of a subprogram, applet, or plug-in. The elevator service request component 211 can be considered to be a subcomponent of the social media application component 210 in some way. An installation package of the elevator service request component 211 may be provided by, for example, an elevator service provider or an elevator provider. An installation package of the social media application component 210 may be provided by a different provider or entity. A developer of the social media application component 210 can provide a corresponding hardware platform to provide an Internet of Things solution, based on which the second wireless signal apparatus 130 is developed.

In an embodiment, as shown in FIG. 2, the second wireless signal apparatus 130 is configured to be adapted to communicate with the social media application component 210 in the personal mobile terminal 200. Therefore, the social media application component 210 not only can realize communication between persons, but also can realize communication between a person and the corresponding wireless signal apparatus of the elevator system 10. Once the passenger 90 enters the elevator car 110, the wireless signal 133 (for example, a Bluetooth Low Energy signal) broadcast by the second wireless signal apparatus 130 installed therein will be automatically sensed, so that the social media application component 210 can automatically establish communication 230 with the second wireless signal apparatus 130. The elevator service request system can further automatically send an elevator service request command to the second wireless signal apparatus 130 that is already in communication with the social media application component through the elevator service request component 211 installed in the social media application component 210. The elevator service request component 211 sets a predefined elevator service request command for the corresponding passenger 90, for example, a command of registering an office floor N of the passenger 90 as a destination floor N. It will be appreciated that, the elevator service request component 211 may further include various other functional modules to improve the passenger experience, which will not be described in detail herein.

In an embodiment, as shown in FIG. 2, the second wireless signal apparatus 130 includes an interface protocol module 133, the interface protocol module 133 being implemented based on a device access interface protocol provided by the developer of the social media application component 210. It should be noted that, for different types of wireless signal apparatuses such as Bluetooth modules and Wifi modules, the interface protocol module 133 is developed and implemented based on different device access interface protocols provided by the developer of the social media application component 210. Exemplarily, when the social media application component 210 is WeChat, the WeChat hardware platform can provide different interface protocols such as AirSync, AirKiss, JSAPI, and SDK to be correspondingly used by second wireless signal apparatuses 130 of different types such as Wifi and Bluetooth, so as to imbed the corresponding interface protocol module 133 into the second wireless signal apparatus 130. The configuration of the interface protocol module 133 enables the second wireless signal apparatus 130 to be adapted to interconnect and communicate with the social media application component 210 in the personal mobile terminal 200.

It will be appreciated that, "interconnection" can establish, for example, a communication connection complying with a certain communication protocol between the social media application component 210 and the wireless signal apparatus of the elevator system 10. The "communication" therebetween facilitates the transmission of various data such as the elevator service request command regarding the destination floor and various messages pushed from the wireless signal apparatus to the social media application component 210.

Further, the second wireless signal apparatus 130 further includes a processor 131 (for example, a Bluetooth processor), a memory 132, and an antenna 134. The antenna 134 may be, for example, a Bluetooth antenna, which may be used for broadcasting a Bluetooth signal (for example, the second wireless signal 133) and an identifier of the second wireless signal apparatus 130, and specifically may broadcast the second wireless signal 133 based on a corresponding Bluetooth communication protocol. The memory 124 may include a corresponding program module configured or installed therein. When executing the program module, the processor 131 may implement a corresponding function of the second wireless signal apparatus 130, for example, to control the antenna 134 to broadcast the Bluetooth signal and the identifier, to further implement the communication 230 with the social media application component 210 of the personal mobile terminal 200 together with the interface protocol module 133, and to receive an elevator service request command sent by the elevator service request component 211 of the social media application component 210 of the personal mobile terminal 200 and upload the elevator service request command to the elevator system (for example, the elevator controller 140).

In an embodiment, the social media application component 210 has a hardware list indicating hardware capable of communicating with the social media application component 210. When the personal mobile terminal 200 carried by the passenger 90 senses for the first time the wireless signal 133 broadcast by the second wireless signal apparatus 130 of the elevator car 110, for example, when taking the elevator car 110 for the first time, the elevator service request system can add the second wireless signal apparatus 130 to the hardware list through the personal mobile terminal 200 by receiving the identifier broadcast by the second wireless signal apparatus 130. In this way, the social media application component 210 can automatically establish communication 230 with the second wireless signal apparatus 130 the next time the elevator car 110 is taken. In another embodiment, the identifier of the second wireless signal apparatus 130 may be posted in the form of, for example, a two-dimensional code near the second wireless signal apparatus 130 (for example, inside the elevator car 110). The passenger 90 can add the second wireless signal apparatus 130 to the hardware list of the social media application component 210 by scanning and recognizing the identifier of the second wireless signal apparatus 130 (for example, scanning a corresponding two-dimensional code).

It will be appreciated that, the passenger 90 may actively add second wireless signal apparatuses 130 in some elevator cars 110 (for example, elevator cars 110 that are frequently taken) to the hardware list of the social media application component 210, and may also actively add identifiers of first wireless signal apparatuses 120 in some landing zones (for example, landing zones corresponding to floors of daily boarding) to the hardware list of the social media application component 210.

Still as shown in FIG. 2, based on the established communication 230, the elevator service request component 211 of the personal mobile terminal 200 may automatically establish a communication connection with the second wireless signal apparatus 130 to send data information such as an elevator service request command (for example, a destination floor registration command). At the same time, the second wireless signal apparatus 130 receives the elevator service request command, and may further send the elevator service request command to the elevator controller 140.

The social media application component 210 is widely used and generally has abundant functions. For example, compared with the operating system of the personal mobile terminal 200 (the operating system OS such as Android, Apple, etc.), the social media application component 210 is easier to gain various permission and therefore is easier to realize various abundant functions, for example, receive a pushed message in the form of a pop-up window. In this way, the elevator service request component 211 installed in the social media application component 210 will also have or use the abundant functions of the elevator service request component 211, making it easier and more convenient to develop and implement the elevator service request component 211.

In an embodiment, the wireless signal apparatus 120 or 130 is further configured to push a message to the social media application component 210 in the personal mobile terminal 200, for example, push a message by means such as a pop-up window, vibration, or audio play. The pushed message includes at least one of the following message types: elevator running status information; response result information of the elevator system 10 for the elevator service request command; and service information associated with a current location of the wireless signal apparatus.

For example, the elevator running status information may include elevator running status information, such as current floor information, traveling direction information, load, and time at which the elevator car 110 is estimated to arrive at the corresponding landing. The wireless signal apparatus 120 or 130 can acquire the status information in real time from the elevator controller 140 of the elevator system 10.

For example, the response result information of the elevator system 10 for the elevator service request command may be information indicating whether the elevator service request operation is successful or not.

The content of the service information associated with the current location of the wireless signal apparatus may be determined in advance by the elevator service provider or the elevator provider, and may be in various forms, allowing the passenger 90 to automatically acquire more information. For example, when the elevator car 110 with the second wireless signal apparatus 130 moves to floor F, names of companies or merchants associated with floor F and services provided by the companies or merchants may be pushed to the social media application component 210, and, displayed on the social media application component 210.

Definitely, the passenger 90 can set the accepted content of the pushed message through the social media application component 210. The accepted pushed message may be notified to the passenger 90 by means such as a pop-up window, vibration, or audio play. Exemplarily, if the elevator service request component 211 sends a destination floor registration command indicating floor N, the social media application component 210, upon determining that the corresponding elevator car 110 has moved to floor N, may notify the passenger 90 through vibration that the floor N is reached. Definitely, it may also notify the passenger 90 through a pop-up window that the floor N is reached.

Figure 3:
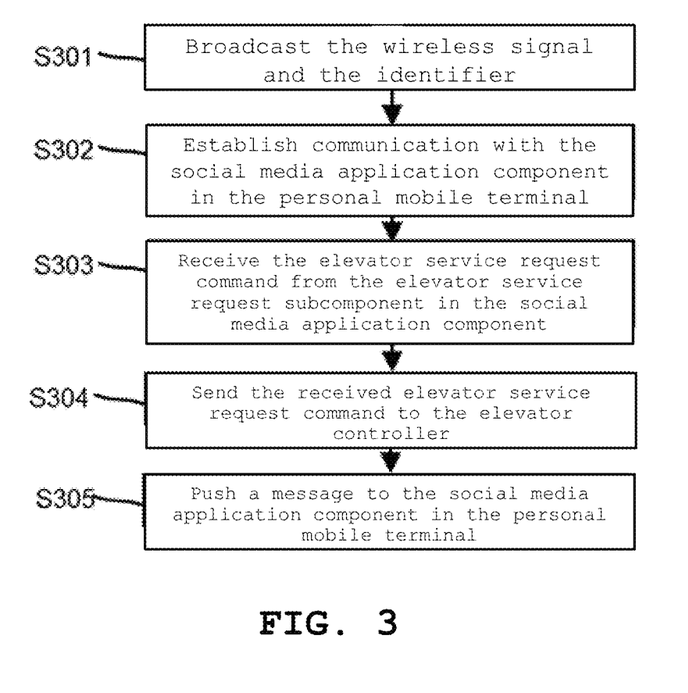
FIG. 3 is a flowchart of an elevator service request method according to an embodiment of the present invention.

In an embodiment, the first wireless signal apparatus 120 and/or the second wireless signal apparatus 130 may establish near field communication with the personal mobile terminal 200, to at least implement the transmission of the elevator service request command generated by the personal mobile terminal 200 to the first wireless signal apparatus 120 and/or the second wireless signal apparatus 130. Accordingly, as shown in FIG. 3, each personal mobile terminal 200 may include a near field communication unit 210 such as a Bluetooth module or a Wifi module. Each first wireless signal apparatus 120 or second wireless signal apparatus 130 includes a wireless communication unit 121.

In another embodiment, as shown in FIG. 2, corresponding to social media application components 210 in numerous personal mobile terminals 200, a corresponding server 420 is provided, which may be provided by, for example, the developer of the social media application component 210; corresponding to second wireless signal apparatuses 130 of numerous elevator cars 110 of numerous elevator systems 10, a server 410 may be provided in common. The server 410 is capable of establishing a remote connection with the second wireless signal apparatus 130. The servers 410 and 420 can both be provided in an Internet network, and may each be implemented by one or more computer devices or may be implemented in the form of "cloud", i.e., a cloud server. Complicated information in the pushed message, for example, the above-mentioned service information, may be pushed to the social media application component 210 through the server 410 and the server 420, and the second wireless signal apparatus 130, the elevator controller 140 or the personal mobile terminal 200 may send to the server 410 a condition for triggering the push.

It should be noted that, the functions of the server 410 are not limited to the above-mentioned example, and the server 410 can also implement more other functions, for example, remotely updating the program of the interface protocol module 133.

It will be appreciated that, the elevator service request system and the elevator system 10 described in the above-mentioned examples can have at least one of the following advantages:

Firstly, it is not necessary to provide a remote communication apparatus for each elevator system 10 to communicate with the server 420 of the social media application component 210. Instead, it can conveniently communicate with the social media application component 210 installed in the personal mobile terminal 200 of the passenger 90 through the short-range wireless signal apparatus 120 or 130, and the passenger using the social media application component 210 can conveniently send the elevator service request command without performing any operation;

Secondly, because the social media application component 210 is widely used among passengers 90, the elevator service request component 211 installed in the social media application component 210 is easy to accept for the passengers 90, and is also easy to promote and use;

Thirdly, the elevator service request component 211 can automatically run in the social media application component 210, and the passenger 90 does not need to perform permission setting for the elevator service request component 211 to automatically complete an elevator service request, which is easy to accept for the passenger 90 and offers good use experience;

Fourthly, the elevator service request component 211 can be developed on the basis of the social media application component 210, making it easier to take advantage of the existing functions of the social media application component 210 to enrich and expand the functions related to the elevator service request, thus improving the user experience.

An elevator service request method an embodiment of the present invention is further described below by way of example with reference to FIG. 1 to FIG. 3. The elevator service request method of the embodiment is applied to the elevator service request system shown in the example of FIG. 2.

In step S301, the wireless signal apparatus 120 or 130 broadcasts the wireless signal 123 or 133, and may also broadcast their identifier. The broadcast process is basically continuously performed. It will be appreciated that, corresponding to step S301, from the perspective of the personal mobile terminal 200, the personal mobile terminal 200 receives the identifier broadcast by the wireless signal apparatus or scans and recognizes the identifier of the wireless signal apparatus to add the wireless signal apparatus to the hardware list of the social media application component 210, the hardware list indicating hardware capable of communicating with the social media application component.

In step S302, the wireless signal apparatus establishes communication with the social media application component 210 in the personal mobile terminal 200. In this step, the communication may be established based on the device access interface protocol provided by the developer of the social media application component 210, for example, may be implemented based on the interface protocol module 133.

In step S303, the wireless signal apparatus receives the elevator service request command from the elevator service request component 211 in the social media application component 210. It will be appreciated that, corresponding to step 303, the personal mobile terminal 200 sends the corresponding elevator service request command. The elevator service request command may be predefined and automatically generated in the elevator service request component 211.

In step S304, the received elevator service request command is uploaded to the elevator system 10, for example, uploaded to the elevator controller 140. Correspondingly, the elevator controller 140 of the elevator system 10 can respond to the elevator service request command, and return response result information to the wireless signal apparatus 120 or 130.

In step S305, a message is pushed to the social media application component 210 in the personal mobile terminal 200. In an embodiment, the pushed message includes at least one of the following message types: elevator running status information; response result information of an elevator system for the elevator service request command; and service information associated with a current location of the wireless signal apparatus.

For example, the elevator running status information may include elevator running status information, such as current floor information, traveling direction information, load, and time at which the elevator car 110 is estimated to arrive at the corresponding landing. The wireless signal apparatus 120 or 130 can acquire the status information in real time from the elevator controller 140 of the elevator system 10.

For example, the response result information of the elevator system 10 for the elevator service request command may be information indicating whether the elevator service request operation is successful or not.

The content of the service information associated with the current location of the wireless signal apparatus may be determined in advance by the elevator service provider or the elevator provider, and may be in various forms, allowing the passenger 90 to automatically acquire more information. For example, when the elevator car 110 with the second wireless signal apparatus 130 moves to floor F, names of companies or merchants associated with floor F and services provided by the companies or merchants may be pushed to the social media application component 210, and, displayed on the social media application component 210.

In an embodiment, the elevator running status information and the response result information may be directly pushed to the social media application component 210 through the wireless signal apparatus 120 or 130 configured to broadcast a wireless signal. The service information may be pushed to the social media application component 210 through the server 410 coupled to a plurality of wireless signal apparatuses 120 and 130 and the server 410 provided corresponding to the social media application component 210.

Corresponding to step S305, at the personal mobile terminal 200, the accepted pushed message may be notified to the passenger 90 by means such as a pop-up window, vibration, or audio play. Exemplarily, if the elevator service request component 211 sends a destination floor registration command indicating floor N, the social media application component 210, upon determining that the corresponding elevator car 110 has moved to floor N, may notify the passenger 90 through vibration that the floor N is reached. Definitely, it may also notify the passenger 90 through a pop-up window that the floor N is reached.

It should be noted that, step S302 to step S305 may be repeatedly performed, and may be performed in either the first wireless signal apparatus 120 installed in the landing zone or the second wireless signal apparatus 130 installed in the elevator car 110.

It will be appreciated that in the block diagrams and/or flowcharts of the method, the system, and the apparatus according to the embodiments of the present invention, each block of the flowchart descriptions and/or the block diagrams, and the combinations of the flowchart descriptions and/or the block diagrams can be implemented by using computer program instructions. The computer program instructions can be provided to a processor of a general purpose computer, a special purpose computer, or other programmable data processing device, to produce a machine, so that the instructions executed by the processor of the computer or other programmable data processing device create components for implementing functions/operations specified in these flowcharts and/or blocks and/or one or more of the flowchart blocks.

These computer program instructions may be stored in a computer readable memory. These instructions can instruct the computer or another programmable processor to implement the functions in specific manners, such that these instructions stored in the computer readable memory construct a product including instruction components for implementing the functions/operations specified in one or more blocks of the flowcharts and/or block diagrams.

These computer program instructions can be loaded onto a computer or other programmable data processor to cause a series of operational steps to be performed on the computer or other programmable processor to form a computer-implemented process, so that the instructions executed on the computer or other programmable data processor provide steps for implementing the functions or operations specified in one or more of the blocks of the flowchart and/or block diagram. It should be further noted that in some alternative implementations, the functions/operations shown in the blocks may not take place according to the sequence shown in the flowchart. For example, two blocks shown sequentially may be performed substantially at the same time, or these blocks sometimes may be performed in a reversed order, which specifically depends on the functions/operations involved.

The foregoing descriptions are exemplary and are not defined to be limitative. Various non-limitative implementation solutions are disclosed in this specification; however, according to the foregoing teaching, those of ordinary skill in the art will be aware that various modifications and variations will fall within the scope of the appended claims. Therefore, it will be appreciated that disclosure content other than those specifically disclosed can be implemented within the scope of the appended claims. Therefore, the appended claims should be read up to determine the real scope and content.

What is claimed is:

1. An elevator service request system, comprising a wireless signal apparatus configured to broadcast a wireless signal and establish wireless communication with a personal mobile terminal carried by a passenger based on the wireless signal, wherein the wireless signal apparatus is configured to be adapted to communicate with a social media application component in the personal mobile terminal;
   wherein the elevator service request system sends, through an elevator service request component installed in the social media application component, an elevator service request command to the wireless signal apparatus that is already in communication with the social media application component; and
   wherein the wireless signal apparatus is further configured to receive the elevator service request command;
   wherein the wireless signal apparatus is configured with an interface protocol module configured to implement the communication, the interface protocol module being implemented based on a device access interface protocol provided by a developer of the social media application component.

2. The elevator service request system according to claim 1, wherein the wireless signal apparatus is further configured to send the received elevator service request command to a corresponding elevator controller.

3. The elevator service request system according to claim 1, wherein the wireless signal apparatus is further configured to push a message to the social media application component in the personal mobile terminal.

4. The elevator service request system according to claim 3, wherein the pushed message comprises at least one of the following message types:
   elevator running status information;
   response result information of an elevator system for the elevator service request command; and
   service information associated with a current location of the wireless signal apparatus.

5. The elevator service request system according to claim 1, wherein the wireless signal apparatus is installed in an elevator car and/or a landing zone of an elevator system.

6. The elevator service request system according to claim 1, wherein the wireless signal apparatus is added to a hardware list of the social media application component through the personal mobile terminal by receiving an identifier broadcast by the wireless signal apparatus or scanning and recognizing the identifier of the wireless signal apparatus, the hardware list being a list of hardware capable of communicating with the social media application component.

7. The elevator service request system according to claim 1, wherein the social media application component is WeChat, WhatsApp, Line, Weibo, Twitter, or Facebook.

8. The elevator service request system according to claim 1, wherein the wireless signal apparatus is a Bluetooth module or a Bluetooth Low Energy module, and the wireless signal is a Bluetooth signal or a Bluetooth Low Energy signal.

9. An elevator system, comprising:
   the elevator service request system according to claim 1; and
   an elevator controller, configured to control operation of one or more elevator cars in the elevator system;
   wherein the elevator controller is coupled to the wireless signal apparatus in the elevator service request system and at least controls the operation of the one or more elevator cars in the elevator system in response to an elevator service request command.

10. An elevator service request system, comprising a wireless signal apparatus configured to broadcast a wireless signal and establish wireless communication with a personal mobile terminal carried by a passenger based on the wireless signal, wherein the wireless signal apparatus is configured to be adapted to communicate with a social media application component in the personal mobile terminal:
    wherein the elevator service request system sends, through an elevator service request component installed in the social media application component, an elevator service request command to the wireless signal apparatus that is already in communication with the social media application component; and
    wherein the wireless signal apparatus is further configured to receive the elevator service request command;
    wherein the wireless signal apparatus is configured with an identifier, and the identifier is broadcast together with the wireless signal.

11. An elevator service request system, comprising a wireless signal apparatus configured to broadcast a wireless signal and establish wireless communication with a personal mobile terminal carried by a passenger based on the wireless signal, wherein the wireless signal apparatus is configured to be adapted to communicate with a social media application component in the personal mobile terminal;
    wherein the elevator service request system sends, through an elevator service request component installed in the social media application component, an elevator service request command to the wireless signal apparatus that is already in communication with the social media application component; and
    wherein the wireless signal apparatus is further configured to receive the elevator service request command;
    wherein a communication connection is automatically established with the wireless signal apparatus through the elevator service request component of the personal mobile terminal to send the elevator service request command.

12. An elevator service request method, comprising:
    broadcasting a wireless signal;
    establishing communication with a social media application component in a personal mobile terminal;
    receiving an elevator service request command from an elevator service request component installed in the social media application component;
    pushing a message to the social media application component in the personal mobile terminal;
    wherein in the pushing the message, the service information is pushed to the social media application component through a first server coupled to a plurality of wireless signal apparatuses configured to broadcast wireless signals and a second server provided corresponding to the social media application component.

13. The elevator service request method according to claim 12, further comprising a step of sending the received elevator service request command to a corresponding elevator controller.

14. The elevator service request method according to claim 12, wherein the pushed message comprises at least one of the following message types:
   elevator running status information;
   response result information of an elevator system for the elevator service request command; and
   service information associated with a current location of a wireless signal apparatus.

15. The elevator service request method according to claim 14, wherein in the step of pushing a message, the elevator running status information and the response result information are directly pushed to the social media application component through the wireless signal apparatus configured to broadcast the wireless signal.

16. The elevator service request method according to claim 12, wherein the elevator service request command comprises an elevator service request command regarding a destination floor and/or an elevator service request command regarding an elevator call direction.

17. The elevator service request method according to claim 12, wherein in the step of establishing communication, the communication is established based on a device access interface protocol provided by a developer of the social media application component.

18. The elevator service request method according to claim 12, wherein in the step of broadcasting a wireless signal, an identifier of a wireless signal apparatus is further broadcast.

19. The elevator service request method according to claim 12, wherein the social media application component is WeChat, WhatsApp, Line, Weibo, Twitter, or Facebook.

20. The elevator service request method according to claim 12, wherein the wireless signal is a Bluetooth signal or a Bluetooth Low Energy signal, and the communication is Bluetooth communication or Bluetooth Low Energy communication.

21. A wireless signal apparatus, comprising a memory, a processor, and a program that is stored in the memory and can be run on the processor, wherein when the program is executed by the processor, the steps of the elevator service request method according to claim 12 are implemented.

22. A non-transitory computer readable storage medium, having stored thereon a computer program, wherein the program is executable by a processor to implement the steps of the elevator service request method according to claim 12.

* * * * *